US009639682B2

(12) United States Patent
North et al.

(10) Patent No.: US 9,639,682 B2
(45) Date of Patent: May 2, 2017

(54) VOICE ACTIVATED APPLICATION FOR MOBILE DEVICES

(71) Applicant: ADT US HOLDINGS, INC., Boca Raton, FL (US)

(72) Inventors: Raymond North, Boca Raton, FL (US); Jocelyne Norris, Fort Lauderdale, FL (US); Frank Chu, Cupertino, CA (US)

(73) Assignee: ADT US Holdings, Inc., Boca Raton, FL (US)

( * ) Notice: Subject to any disclaimer, the term of this patent is extended or adjusted under 35 U.S.C. 154(b) by 395 days.

(21) Appl. No.: 14/562,314

(22) Filed: Dec. 5, 2014

(65) Prior Publication Data

US 2015/0161370 A1 Jun. 11, 2015

Related U.S. Application Data

(60) Provisional application No. 61/912,746, filed on Dec. 6, 2013.

(51) Int. Cl.
*G06F 21/32* (2013.01)
*G07C 9/00* (2006.01)
*G10L 17/22* (2013.01)

(52) U.S. Cl.
CPC ......... *G06F 21/32* (2013.01); *G07C 9/00158* (2013.01); *G10L 17/22* (2013.01)

(58) Field of Classification Search
CPC ...... G06F 21/32; G07C 9/00158; G10L 17/22
See application file for complete search history.

(56) References Cited

U.S. PATENT DOCUMENTS

| | | | |
|---|---|---|---|
| 6,263,311 B1 | 7/2001 | Dildy | |
| 6,510,415 B1 * | 1/2003 | Talmor | G10L 17/00 704/246 |
| 6,519,565 B1 | 2/2003 | Clements et al. | |
| 6,879,968 B1 * | 4/2005 | Hayakawa | G10L 17/08 704/E17.008 |

(Continued)

FOREIGN PATENT DOCUMENTS

EP    1378886 A1    1/2004

OTHER PUBLICATIONS

Written Opinion of the International Preliminary Examining Authority dated Nov. 4, 2015 for International Application No. PCT/US2014/068903, International Filing Date Dec. 5, 2014 (5-pages).

(Continued)

*Primary Examiner* — Darren B Schwartz
(74) *Attorney, Agent, or Firm* — Christopher & Weisberg, P.A.

(57) ABSTRACT

A system and methods for performing authentication to enable a user to access a site monitoring system are provided. The authentication includes voice authentication having at least one threshold that may be dynamically adjustable between false-rejection and false-acceptance. The system includes a processor configured to adjust the at least one threshold for the voice authentication based on at least one factor associated with the site monitoring system. The processor may be configured to perform voice authentication based on the adjusted at least one threshold to authenticate the user.

18 Claims, 13 Drawing Sheets

(56) References Cited

U.S. PATENT DOCUMENTS

| | | | | |
|---|---|---|---|---|
| 2001/0032074 A1* | 10/2001 | Harris | G06Q 20/305 | 704/231 |
| 2001/0048025 A1* | 12/2001 | Shinn | A61B 5/117 | 235/382 |
| 2001/0056349 A1* | 12/2001 | St. John | G07C 9/00158 | 704/270 |
| 2003/0115473 A1* | 6/2003 | Sugimura | G06F 21/32 | 713/186 |
| 2003/0152252 A1* | 8/2003 | Kondo | G07C 9/00158 | 382/117 |
| 2003/0220790 A1* | 11/2003 | Kepuska | G10L 15/12 | 704/241 |
| 2004/0164848 A1* | 8/2004 | Hwang | G06F 21/32 | 340/5.82 |
| 2004/0219902 A1* | 11/2004 | Lee | G06F 21/36 | 455/410 |
| 2005/0096906 A1 | 5/2005 | Barzilay | | |
| 2005/0201597 A1* | 9/2005 | Wendt | G06K 9/0008 | 382/125 |
| 2006/0090079 A1 | 4/2006 | Oh et al. | | |
| 2006/0286969 A1* | 12/2006 | Talmor | G06F 21/32 | 455/415 |
| 2006/0293891 A1 | 12/2006 | Pathuel | | |
| 2007/0106517 A1 | 5/2007 | Cluff et al. | | |
| 2007/0219792 A1* | 9/2007 | Normandin | G10L 15/26 | 704/239 |
| 2008/0071535 A1* | 3/2008 | Yoshioka | G10L 17/02 | 704/246 |
| 2010/0115611 A1* | 5/2010 | Morihara | G06F 21/31 | 726/19 |
| 2010/0121644 A1* | 5/2010 | Glasser | G10L 17/04 | 704/273 |
| 2010/0180127 A1 | 7/2010 | Li et al. | | |
| 2011/0224986 A1* | 9/2011 | Summerfield | G10L 17/12 | 704/246 |
| 2013/0225128 A1* | 8/2013 | Gomar | H04W 12/06 | 455/411 |
| 2013/0259330 A1* | 10/2013 | Russo | G06K 9/00087 | 382/124 |
| 2014/0167931 A1 | 6/2014 | Lee et al. | | |
| 2014/0222837 A1* | 8/2014 | Strathmann | G06F 19/366 | 707/752 |
| 2015/0161370 A1* | 6/2015 | North | G07C 9/00158 | 726/5 |

OTHER PUBLICATIONS

PCT Notification Concerning Transmittal of International Preliminary Report on Patentability dated Mar. 1, 2016 for corresponding International Application No. PCT/US2014/068903; International Filing Date: Dec. 5, 2014, consisting of 23-pages.

International Search Report and Written Opinion dated Mar. 16, 2015 for International Application No. PCT/US2014/068903, International Filing Date Dec. 5, 2014, consisting of 8 pages.

* cited by examiner

VOICE ACTIVATED APPLICATION FOR MOBILE DEVICES

CROSS-REFERENCE TO RELATED APPLICATION

This application is related to and claims priority to U.S. Provisional Patent Application Ser. No. 61/912,746, filed Dec. 6, 2013, entitled "MULTI-TIERED SECURITY USING VOICE AUTHENTICATION", the entirety of which is incorporated herein by reference.

STATEMENT REGARDING FEDERALLY SPONSORED RESEARCH OR DEVELOPMENT n/a

FIELD OF THE INVENTION

The invention relates to a site monitoring system, and in particular to voice authentication for accessing the system.

BACKGROUND OF THE INVENTION

The desire to be safe and secure—as to one's person, property, and identity—is fundamental. As communication technology has improved over the years—such as with the creation of digital communications, cellular and other wireless networks, broadband and the Internet—so has the ability to protect the things that matter most. At the same time, these changes in technology have made personal protection more complex. People are physically more mobile today, are in their homes less. More activities are taking place outside the home and via mobile devices. Accordingly, most site security and automation systems today are accessible and controllable directly from a smart phone or other mobile device.

However, these mobile applications require a careful balance between ease of use and security. These applications typically have lower levels of authentication security to make the application more user-friendly, providing a better customer experience. Increasing the level of security in these mobile applications would make the application more difficult to use, which negatively impacts the user experience and reduces the usability of the application. This creates a significant challenge in mobile applications for site security and automation, because a mobile device can be misplaced or stolen, and thus may be more vulnerable to allowing unauthorized access to an individual's security system—which can put individuals at risk of harm to themselves, their property, and their privacy.

Conventional voice authentication technology has been considered as one solution to this problem, where the end-user's voice is used for login authentication. However, such voice authentication technology may not be sufficiently secure for mobile site security and automation applications, or making it more secure would make create the same usability issues.

Multi-tiered and multi-factor authentication processes have been used in a number of contexts to enhance security when accessing systems online, particularly from mobile devices. For example, U.S. Pat. No. 8,583,498 describes a system and method for biometrics-based fraud prevention. U.S. Pat. No. 8,151,326 describes using audio in N-factor authentication. And, U.S. Pat. No. 7,766,223 describes a method and system for mobile services using a unique identification number associated with a mobile device and a user account, and employing enhanced multi-factor and biometric security authentication in conducting transactions using the mobile device. However, these multi-tiered and multi-factor authentication systems are not directed to monitoring systems such as security systems and home automation systems.

SUMMARY OF THE INVENTION

The invention advantageously provides a site monitoring system, in particular to voice authentication for accessing the system.

According to one embodiment of the invention, a system for performing authentication to enable a user to access a site monitoring system via a user interface is provided. The authentication includes voice authentication having at least one threshold that is dynamically adjustable between false-rejection and false-acceptance. The system includes a memory configured to store the at least one threshold and a processor in communication with the memory. The processor is configured to adjust the at least one threshold for the voice authentication. The adjustment to the at least one threshold is based on at least one factor associated with the site monitoring system. The processor is configured to perform voice authentication based on the adjusted at least one threshold to authenticate the user.

According to one embodiment of this aspect, the memory and processor are contained in a user device. According to another embodiment of this aspect, the user device is a portable wireless device. According to another embodiment of this aspect, the system includes a server in communication with the user device. The server includes a communication interface that may be configured to communicate a plurality of predetermined thresholds for voice authentication to the device. The plurality of predetermined thresholds corresponds to a plurality of factors including the at least one factor associated with the device. The processor may be configured to determine that one of the plurality of factors are met, and determine at least one of the plurality of thresholds corresponding to the factor that is met. The adjustment of the at least one threshold for the voice authentication is based on the determined at least one of the plurality of thresholds.

According to another embodiment of this aspect, the at least one factor may include at least one of geo-location data for the user device, Internet Protocol address of the user device, login enforcement by the user device, background acoustic environment of the user device and a predefined time period since a last non-voice based login with the site monitoring system. According to another embodiment of this aspect, the at least one threshold is adjusted based on at least on the geo-location data for the user device associated with the site monitoring system. The at least one threshold may be adjusted to increase a probability of false-rejection if the device is not proximate a site monitored by the site monitoring system. Alternatively, the at least one threshold is adjusted to increase a probability of false-acceptances if the device is proximate the site monitored by the site monitoring system.

According to another embodiment, the at least one threshold may include a degree of match between a voice signal and a voice pattern. According to another embodiment of this aspect of the invention, the at least one threshold may be adjusted to increase a probability of false-rejections of the voice authentication. Alternatively, the at least one threshold may be adjusted to increase a probability of false-acceptances of the voice authentication. According to another embodiment, the voice authentication may require matching at least one audio challenge phrase. The authentication may also be a multi-factored authentication in combination with the voice authentication.

According to another embodiment of the invention, the multi-factor authentication may include at least one of knowledge based authentication, security token based authentication, user device based authentication, biometric based authentication and manual login. The multi-factor authentication provides access to predetermined functionality including at least one of Arm/Disarm, Lock/Unlock and accessing video.

According to another aspect of the invention, a method for performing authentication to enable a user to access a site monitoring system via a user interface is provided. The authentication includes voice authentication having at least one threshold that is dynamically adjustable between false-rejection and false-acceptance. The at least one threshold for the voice authentication may be adjusted based on at least one factor associated with the site monitoring system. Voice authentication is performed based on the adjusted at least one threshold to authenticate the user.

According to one embodiment of this aspect, the at least one factor includes at least one of geo-location data of the device, Internet Protocol address of the device, login enforcement by the device, background acoustic environment of the device and a predefined time period since a last non-voice based login with the site monitoring system. According to another embodiment of this aspect, the at least one threshold may be adjusted based on at least on the geo-location data for a user device associated with the site monitoring system. The at least one threshold may also be adjusted to increase a probability of false-rejection if a user device associated with the site monitoring system is not proximate a site monitored by the site monitoring system. Alternatively, the at least one threshold may be adjusted to increase a probability of false-acceptances if the user device is proximate the site monitored by the site monitoring system.

According to another embodiment, the at least one threshold may include a degree of match between a voice signal and a voice pattern. The at least one threshold may be adjusted to increase a probability of false-rejections of the voice authentication. Alternatively, the at least one threshold is adjusted to increase a probability of false-acceptances of the voice authentication. According to another embodiment, the voice authentication requires matching at least one audio challenge phrase.

According to another embodiment of the invention, the user authentication may be a multi-factored authentication in combination with the voice authentication. According to another embodiment of this aspect, the multi-factor authentication may include at least one of knowledge based authentication, security token based authentication, user device based authentication, biometric based authentication and manual login. According to another embodiment, the multi-factor authentication may provide access to predetermined functionality including at least one of Arm/Disarm, Lock/Unlock and accessing video.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
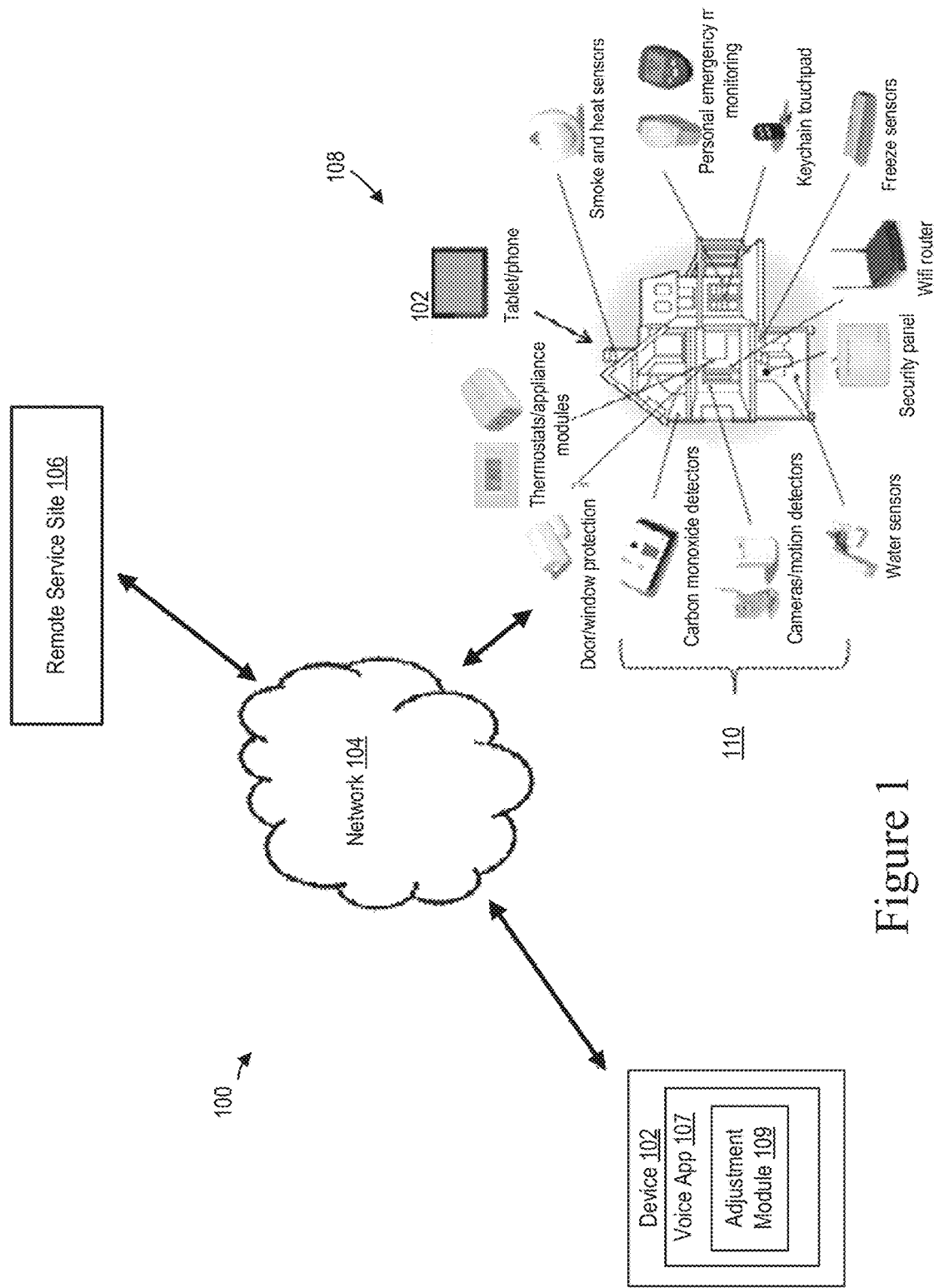
FIG. 1 is an illustration of a site monitoring system employing the invention.

For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation. For example, the invention is described herein in connection with a smart phone and similar mobiles devices for purposes of illustration, not of limitation.

Before describing in detail exemplary embodiments that are in accordance with the invention, it is noted that the embodiments reside primarily in combinations of device components and processing steps related to voice authentication using dynamically adjustable thresholds in a site monitoring system and devices, such as fire and security systems; home automation and control systems; personal emergency response system (PERS), medical monitoring, and wellness systems; and related devices. Accordingly, components have been represented where appropriate by conventional symbols in the drawings, showing only those specific details that are pertinent to understanding the embodiments of the invention so as not to obscure the invention with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and would not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

The figures will be used to illustrate aspects of the invention. As shown in FIG. 1, a system 100 includes one or more devices 102, one or more networks 104, remote service site 106 and site monitoring system 108. Device 102 may be a portable wireless device carried by a user associated with the site or premises being monitored by site monitoring system 108. Device 102 may include any one of a number of know mobile devices such as a "smart phone" as shown, other cellular phones, and other Wi-Fi and/or cellular enable PDA's, such as tablets. Internally, such mobile devices include hardware and software (e.g., iOS, Android, Windows Phone, Blackberry, etc.), the operation of which is well known to those of ordinary skill in the art and will not be elaborated upon here. Such mobile devices are typically configured to be capable of downloading and operating a variety of software applications ("apps") in a conventional manner. One such app, i.e., voice application 107 including adjustment module 109, may be used in providing aspects of the invention as further discussed herein.

Such mobile devices also typically include a touch screen display and collectively the mobile device may be part of device 102 according to aspects of the invention. Alternatively, however, device 102 may incorporate myriad configurations of physical buttons, keypads, trackballs, and the like—either integral to the device, connected thereto via a communication cable, or in communication therewith via wireless protocol (e.g., Bluetooth, Wi-Fi, etc.), depending on what mobile device is used. The invention is not limited in this regard so long as the mobile device operates in accordance with the invention as described herein, such as part of device 102.

Figure 2:
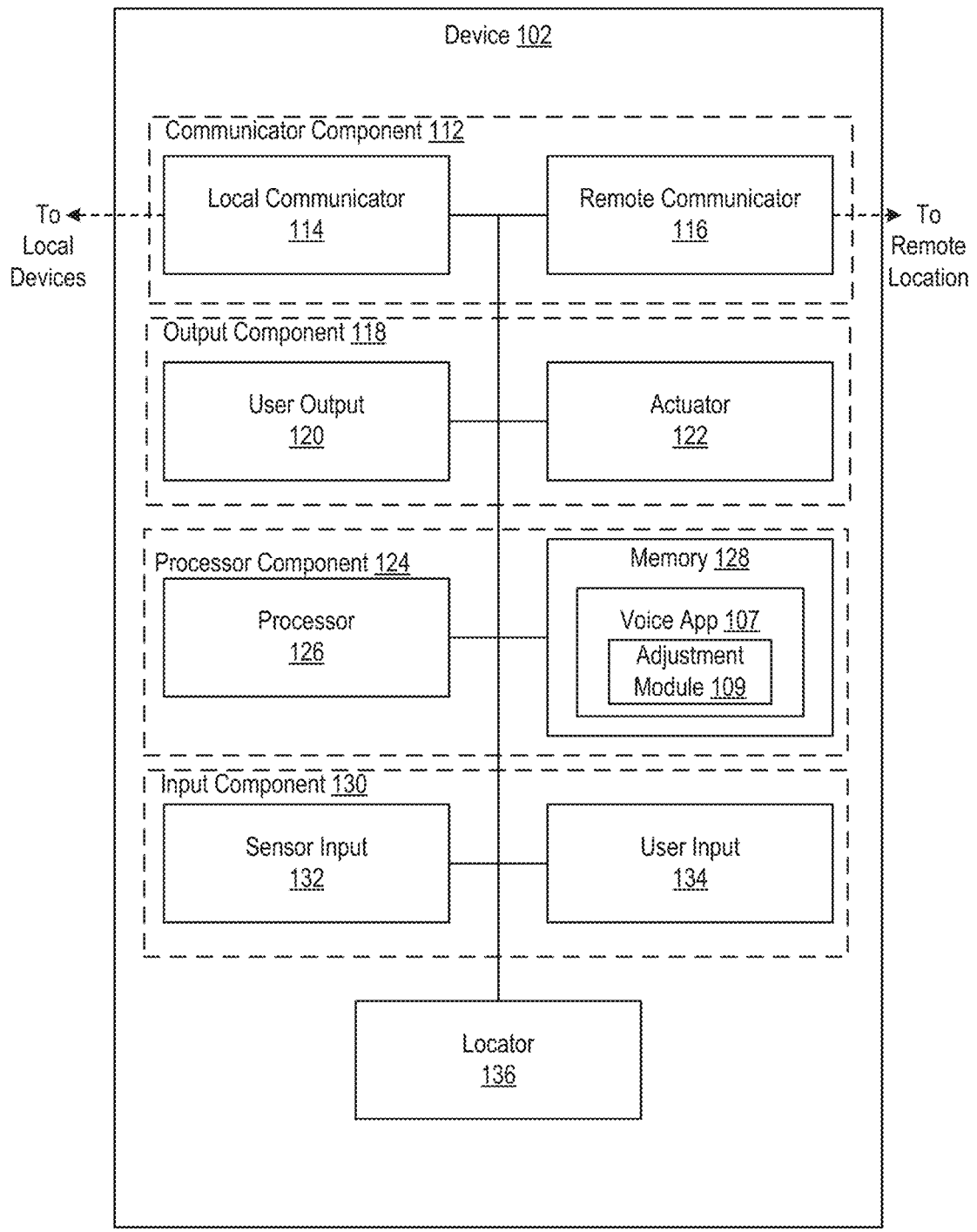
FIG. 2 is an illustration of functional elements of a device in accordance with the aspects of the invention.

Some examples of functional elements of device 102 for the invention are illustrated in FIG. 2, as discussed in detail below. For example, device 102 includes voice application (app) 107 that provides the ability for authorized users of system 108 to access system 108 functionality by using voice commands on their respective device 102, and may also include adjustment module 109 for adjusting one or more thresholds used for voice authentication, as is discussed in detail with respect to FIG. 3. While adjustment module 109 is illustrated being part of voice application, in one embodiment, adjustment module 109 is separate from voice application. The voice commands may allow a user to receive various information about system 108 such as summary status, light status, security status, lock status, thermostat status, temperature status, energy meter status, mode stats and other information. Those of ordinary skill in the art will appreciate that these functional elements may be implemented in various combinations of hardware and software, either within a smart phone or other mobile device or in combination therewith. Some of these combinations will be referenced herein for illustration; the invention is not limited to those embodiments but only as set forth in the claims.

Network 104 may include one or more communication links. In particular, the communication links may be broadband communication links such as a wired cable modem or Ethernet communication link, digital cellular link, e.g., long term evolution (LTE) based link, among other broadband communication links known in the art. Broadband as used herein may refer to a communication link other than a plain old telephone service (POTS) line. The Ethernet communication link may be an IEEE 802.3 based communication link. Network 18 may be a wide area network, local area network, wireless local network, global network, metropolitan area network, among other network know in the art. Network 104 provides communications among device 102, remote service site 106 and system 108.

Remote service site 106 may perform monitoring, configuration and/or control functions associated with system 108 and/or device 102. Remote service site 106 may include one or more servers, and may be configured to communicate a plurality of predetermined thresholds for voice authentication to device 102. System 108 may include one or more premises devices 110 that may be configured to monitor doors, windows, and other openings, or to control lights, appliances, HVAC systems, etc. For example, one or more detectors 110 may be used to sense motion and other alarm conditions, such as glass breaking, fire, smoke, temperature, chemical compositions, water, carbon monoxide, or other hazardous conditions. Video cameras 110 may be used to detect motion and/or capture video of events. Such sensors 110 are not particularly limited and may also include any number of health, safety, and lifestyle devices—various medical condition monitors and personal emergency response systems, thermostats, appliance modules, key fobs, keypads, and touch screens, a gateway router, etc. When an alarm condition is sensed, a system control panel may transmit an alarm signal to one or more notification devices, such as horns and/or strobes, for example. System 108 is not limited to a home and may also be used within a boat, office suite, industrial building, or any other indoor or outdoor area where security is desired. It should be understood that not all of such premises devices 110 may be installed within a given system.

Premises device 110 may use a variety of wireless communication protocols. Some home automation devices 110 use wireless and/or wired protocols developed for home automation, like X10, Z-wave and ZigBee, while others use more general wireless protocols such as Wi-Fi and Bluetooth. Health monitoring devices 110 may use Bluetooth and Wi-Fi (or may be adapted for home automation protocols). For a number regulatory and safety reasons, and for business reasons, a number of peripherals/premises devices 110 for fire and security use protocols that are proprietary to particular product manufacturers (though the invention is not so limited).

In operation, these peripherals/premises devices 110 may send information (an alarm event, a status update, video feed, etc.) to the security panel and/or gateway, and that information may be communicated to a remote monitoring center, such as remote service site 106, via network 104—where it may be stored, analyzed, and/or provided to an operator for further action. Network 104 may include a cellular network, satellite network, a local or wide area Wi-Fi network, and/or the Internet. The invention is not limited in this regard. Further, device 102 may communicate with one or more premises devices 110 in system 108, e.g., communicate with security panel.

As shown in FIG. 2, device 102 may include communicator component 112, which may include a local communicator 114 for connected/wireless communication with devices in proximity to device 102, and a remote communicator 116 for communication remotely from the system. In a smart phone or tablet for example, this may be a radio utilizing any number of well know RF communication schemes; e.g., local communication may be, for example, via Wi-Fi or Bluetooth (or "mesh" networking such as via Z-Wave or ZigBee); and remote communication may be, for example, via the various forms of cellular radio or broadband via a Wi-Fi connection to a local network, or even satellite if so equipped. Encryption and other security-protection technologies may also be used to help ensure that such communications are not "hacked" to allow unauthorized persons to gain access to the data/video being communicated, or to device 102 and/or peripherals/premises devices 110.

Device 102 may include output component 118 having a user output 120 by which the system 108 may provide information back to the user. In a smart phone or tablet, these functional elements may overlap with the use of a touch screen. Output component 118 may include actuator 122, through which system 108 may provide a control output to achieve some change of state or action (in response to processor component 124) of another part of device 102 or a connected/wireless peripheral device. In a smart phone or tablet, for example, this may mean causing the onboard speaker to broadcast an audible alert, or for the display or light to flash, or for the camera to take a picture/record video, etc.

Device 102 includes processor component 124 that includes processor 126 and memory 128 (and other related hardware known to those of ordinary skill in the art) that are used to process information and actuate the functionality of the invention and the other functional elements of device 102 and to store information used therewith. This may include, for example, an app running atop an operating system in a microprocessor using volatile and/or non-volatile memory, e.g., memory stick, flash memory, random access memory, programmable logic arrays, among other volatile and/or non-volatile memory know in the art. For example, memory 128 may store voice application 107 and/or adjustment module 109, among other data and/or modules. Adjustment module 109 may include instructions, which when executed by processor 126, causes processor 126 to perform the processes described herein, such as the threshold adjustment process, discussed in detail with respect to FIG. 3.

Device 102 includes input component 130 that may also include one or more sensor inputs 132 that enable device 102 to receive input with or without user intervention. In a smart phone or tablet, for example, this may include an onboard video camera, a microphone, and/or an accelerometer. Input component 130, which may include user input 134 by which a user may manually provide input and/or actuate various aspects of the invention.

Device 102 may include a touch screen display, i.e., user output 120, and collectively the mobile device may be part of device 102 according to aspects of the invention. Alternatively, however, such mobile devices may incorporate myriad configurations of physical buttons, keypads, trackballs, and the like—either integral to the device, connected thereto via a communication cable, or in communication therewith via wireless protocol (e.g., Bluetooth, Wi-Fi, etc.), depending on what mobile device is used. The invention is not limited in this regard so long as the mobile device operates in accordance with the invention as described herein, such as part of device 102. Those of ordinary skill in the art will appreciate that these functional elements may be implemented in various combinations of hardware and software, either within a smart phone or other mobile device (e.g. a laptop or other computer) or in combination therewith. Some of these combinations will be referenced herein for illustration; the invention is not limited to those embodiments but only as set forth in the claims.

Voice application 107 operating on device 102 may include the ability for the user to access the functionality of peripherals/premises devices 110 by using voice commands in lieu of (or interchangeably with) manual use of the touch screen or other aspects of input component 130. The application 107 may display a visual indication to the user that the voice control mode is active.

Using the voice application, device 102 may be capable of recognizing key words and device names to perform certain programmed functions in regard to peripherals/premises devices 110, such as: login, arm/disarm the security panel, control lighting devices, control thermostats, lock and unlock doors, change "modes," and log out. The invention is not limited, and can be used for any aspect of a site monitoring system.

In addition to accepting voice command, voice application 107 may also provide auditory feedback on the status of the system or devices or confirmation of actions. This has the advantage of providing a unique interface for visually impaired customers and as a convenience for customers who are not able to use the touch screen on their mobile device 102.

In addition to conventional manual entry of a user name and password for logging into the system, voice application 107 may incorporate voice authentication in order to verify the user and allow access, such as through the use of embedded ASR (Automated Speech Recognition) and speech verification libraries to process a verbal passphrase (alone or in conjunction with a text based username and password). A user may define a secret verbal passphrase consisting of multiple words and train it into voice application 107 during an enrollment process.

Alternatively, the system may provide a passphrase for the user to train into the application. For example, the system may select from a list of phrases stored in memory that could provide the passphrase based on using a random generator to choose the words or by using an algorithm to select combinations of words based on certain criteria. Such criteria may include combinations of words that have been statistically demonstrated to allow voice analysis software to more easily distinguish between similar voices, or statistics on past acceptance/rejection rates of words in past enrollment attempts by this user.

Voice application 107 may employ a number of security capabilities for enhanced voice authentication. Voice authentication may be dynamically adjusted to tradeoff between false-rejection and false-acceptance. This capability may also be used by voice application 107 to adjust the level of security by varying these thresholds based on one or more factors relevant to the user, such as: geo-location data (e.g., whether the device is being used in a location associated with the user), current IP address of the device (e.g., home or office may require different level of security versus an unknown IP address), whether/how device 102 enforces user login (e.g., devices with "screen lock" enabled may utilize a lower authentication threshold), background acoustic environment (e.g., voice login may be disabled in noisy environments due to higher false acceptance rates), and/or time since last manual login with a password.

Voice application 107 may also employ audio challenge phrases. These may be derived from training recordings or captured as additional phrases during passphrase enrollment (described in more detail below). Prompting users to speak challenge phrases adds another level of security.

Voice application 107 may also use multi-factored authentication (e.g., voice login can be combined with other authentication methods for improved security), yet still provide users with simplified login. Multifactor authentication is achieved by combining two or more independent and different types of credentials such as what the user knows (knowledge-based authentication such as secret phrase), what the user has (security token or smart card, user's device), what the user is (biometric verification), who the user is (user's voiceprint). In one embodiment, device 102 may require a combination of a screen login and a voice login for enhanced security. Such a two-factor/tier authentication process reduces app login complexity while improving security.

A common form of knowledge based authentication is the use of "secret" questions for which the user previously has entered their answers (these may be stored in voice application 107 or on remote service site 106, for example). Another is the use of a unique PIN or other code for the security system (that may be stored in remote service site 106, for example).

A security token (sometimes called an authentication token) may be incorporated into a separate hardware device that the user carries to authorize access to a network service (such as in a smart card or in a key fob), or may be incorporated into the operating software or an application operating on device 102 (such as in the case of a smart phone). The device generating the security token may generate and display (in coordination via remote service site 106) a number that uniquely identifies the user to the service, allowing them to login. The identification number for each user may be changed periodically, as is typically the case with such tokens. Use of a security token may be combined with requiring the user's PIN for two-factor authentication.

In this regard, the passphrase used for voice authentication could also be part of multi-factor authentication. The user may be required to speak their PIN, or the security token identification number, for voice login (matched to an earlier enrolled voice pattern for the code, for example).

Voice authentication itself is one form of biometric verification, which includes any means by which a person can be uniquely identified by evaluating one or more distinguishing biological traits. Unique identifiers include fingerprints, hand geometry, earlobe geometry, retina and iris patterns, voice waves, DNA, and signatures.

Input 130 of device 102 could be used for other forms of biometric identification in addition to voice login to accomplish multi-factor authentication. For example, images from the camera of a mobile phone could be used for iris-pattern and retina-pattern authentication methods, and/or facial-recognition. Current smart phone also have built-in (or attachable/sync-able) fingerprint readers that may be used for fingerprint authentication.

In lieu of using multi-factor authentication for login, another approach that may be used is to require the user to use multi-factor authentication to access certain functionality (such as Arm/Disarm, Lock/Unlock, or accessing video), but not for other functionality, such as status commands. This may be by requiring the user to manually enter a personal code/PIN onscreen for accessing such features, for example.

Device 102 may include locator 136 to track the location of device 102 and to generate location information. This may be accomplished a number of ways such as GPS, "pinging," or triangulation of the radio signal—the operation of these means in and of themselves is well known to those of ordinary skill and will not be further elaborated upon here.

Integration of combinations of the aforementioned capabilities has the advantage of allowing the security of the mobile application 107 to be enhanced and tailored to need, while minimizing the impact on the usability of voice application 107 to the user. One or more functions of voice application 107 may be performed by remote service site 106 and/or site monitoring system 108 in accordance with the invention. In other words, device 102 operating voice application 107 provides numerous features and advantages. One such features deals with ease of use for a user to access system 108 without comprising on security. For example, adjustment module 109 is able to dynamically vary or modify at least one threshold used for voice authentication for allowing a user to access system 108, as will now be described with respect to FIG. 3.

Figure 3:
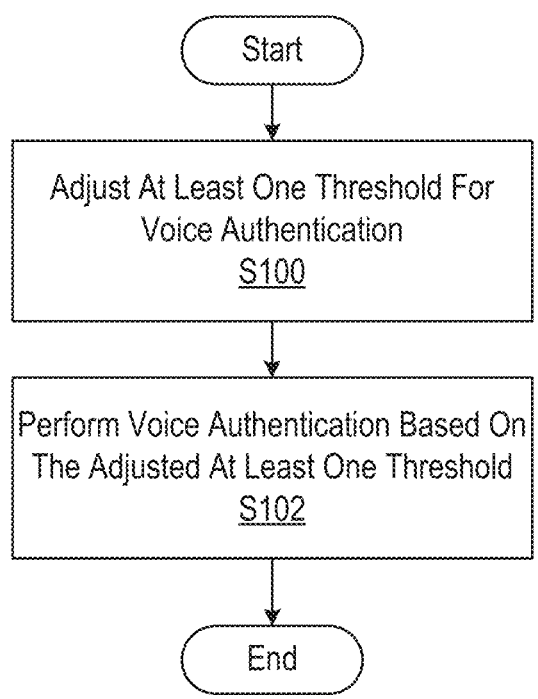
FIG. 3 is a signaling flow diagram of an exemplary threshold adjustment process of adjustment module in accordance with the principles of the invention.

FIG. 3 is a signaling flow diagram of an example of a threshold adjustment process for adjustment module 109. Processor 126 may adjust at least one threshold for voice authentication (Block S100). In one embodiment, a single threshold is used by processor 126 to determine whether a voice login attempt is rejected or accepted. If the threshold is set too high, the voice authentication application 107 may falsely reject a login attempt. On the other hand, if the threshold is set too low, the voice authentication application 107 may falsely accept a login attempt. In another embodiment, device 102 (and/or remote server 106) may store a plurality of thresholds associated with voice authentication. Therefore, processor 126 may adjust the at least one threshold to higher or lower threshold than previous or subsequent threshold(s), i.e., the at least one threshold is adjusted to increase the probability of false-rejections or false acceptances.

Processor 126 may perform voice authentication based on the adjusted at least one threshold (Block S102). For example, if device 102 detects that the screen lock protection of device 102 has been turned on (or fingerprint ID), the at least one threshold may be dynamically lowered from a previous or subsequent threshold value since a user of device 102 has to first authenticate via screen lock (e.g., PIN) or fingerprint. Other examples and embodiments for modifying the at least one threshold are described in detail with respect to FIG. 4.

Figure 4:
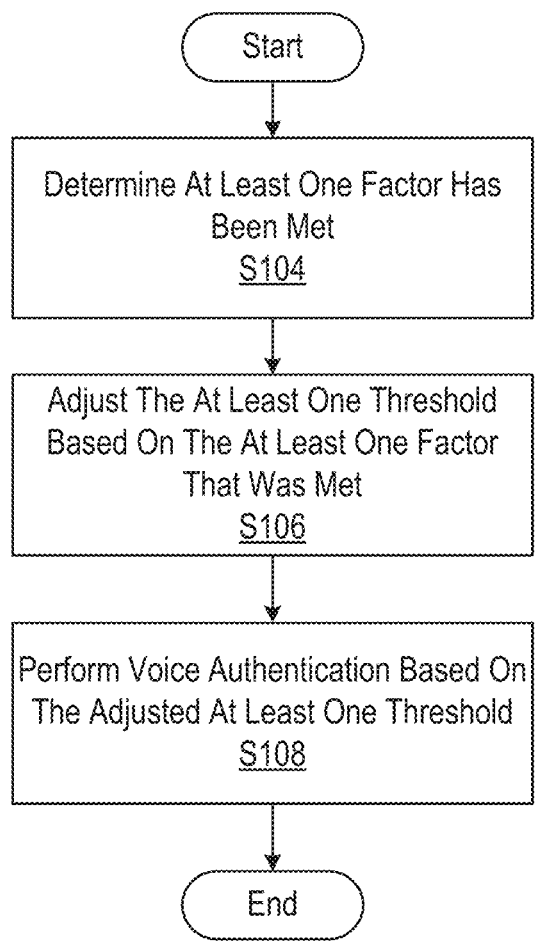
FIG. 4 is a signaling flow diagram of another exemplary threshold adjustment process of adjustment module in accordance with the principles of the invention.

FIG. 4 is a signaling flow diagram of another embodiment of a process that may be performed by adjustment module 109. Processor 126 may determine at least one factor has been met (Block S104). For example, device 102 may have one or more factors stored in memory 128, such as geo-location data for device 102, Internet Protocol (IP) address of device, whether/how device 102 enforces user login, background acoustic environment proximate device 102 and/or system 108, whether device 102 has screen lock protection turned on (or fingerprint ID), a predefined period of time since user of device 102 last logged out and user has not yet locked device 102, and time since last manual login with a password, among other factors. The factors may be updated by remote service site 106.

Processor 126 may adjusts the at least one threshold based on the at least one factor that was met (Block S106). For example, if processor 126 determines that a factor corresponding to a user's phone having screen lock protection turned on (or fingerprint ID), the at least one threshold, e.g., acceptance threshold, may be dynamically lowered from a previous or subsequent threshold value, since the user would also have to authenticate via screen lock PIN or fingerprint ID. In other words, in balancing the need for security against ease of use, it may be considered that a person entering the correct screen lock PIN or fingerprint ID is the authorized user such that an overly high threshold for voice authentication may not be needed.

In another example, if the processor 126 detects that a factor corresponding to a user's device 102 is in a previously unknown (to device 102) or new geographical location is detected based on GPS location data, the at least one threshold may be adjusted to a higher value than a previous or subsequent threshold value. In yet another example, if processor 126 determines a user has logged off (e.g., quit access to remote server site 106 and/or system 108) within a predefined period of time (e.g., 1 minute), and the user has not locked device 102, e.g., initiated screen lock, the at least one threshold may be lowered from a previous or subsequent threshold value. In other words, in balancing the need for security against ease of use, it may be considered that a voice command received proximate to when a verified user logged into the system is likely to be from the verified user. Other examples, for lowering or raising a threshold value for voice authentication may be based user behavior data or phone data.

In one embodiment, the amount of adjustment of the at least threshold may be based on specific factor(s) that were met. For example, a factor corresponding to a GPS location of device 102 being located at a premises monitored by system 108 may lower the at least one threshold more than, equal to or less than the amount that the at least threshold is lowered when the screen protection lock factor is met. The amount of adjustment may be predefined by a system operator, and pushed or downloaded to device 102. Processor 126 performs voice authentication based on the adjusted at least one threshold, as described above with respect to Block S102.

Figure 5:
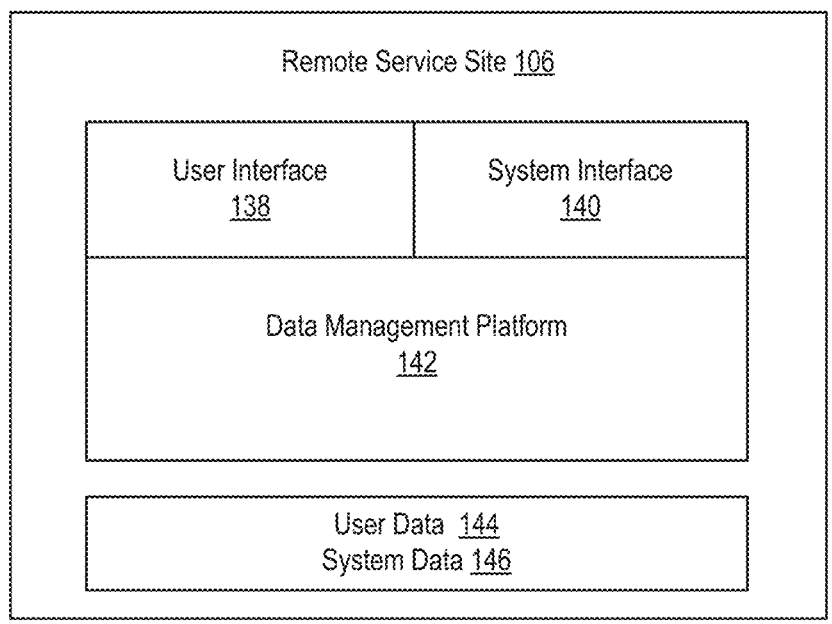
FIG. 5 is an illustration of functional elements of a remote service site operating in accordance with the principles invention.

As shown in FIG. 5, remote service site 106 functionally may include user interface 138 for receiving information from and transmitting information to the user via device 102, a system interface 140 for receiving information from and transmitting information to peripherals 110 or other systems, a data management platform 142 for storing and manipulating data in conjunction with the interfaces and the analytics engine, user database 144 and system database 146.

User interface 138 may comprise, for example, any combination of technologies capable of connecting the user with remote service site 106 and enabling the functionality described herein, such as an application 107 operating on device 102, a broadband network gateway device on the user's home network or on a remote network, etc. System interface 140 may comprise, for example, application program interfaces ("API's") and similar software for facilitating the transmission (and understanding) of data. Similarly, the remaining functionality and components of remote service site 106 and the invention generally may comprise integrated or separate hardware, software, data architectures, and other devices known in the art that can achieve the functionality described herein.

Consistent with conventional security systems and services, remote service site 106 may also include, for example a security monitoring center having receiving equipment (e.g., computer servers) for receiving in-bound calls from device 102 and exchanging information therewith, and routing calls to a human operator. The operator may use database software and systems to retrieve information about the user based on user and event information received from peripherals/premises devices 110 and/or device 102.

In addition, such information could be provided to device 102 for use by the user, and the user can submit instructions/commands/requests for additional information back to the security panel 110, gateway 110, and/or peripheral/premises devices 110 via network 104—either directly or through remote service site 106. In this way, a user may employ device 102 to interface with peripherals/premises devices 110 in order to program, control, and configure those systems, or how those systems control or interact with other peripherals.

A more detailed overview of the operation of a mobile application 107 loaded on device 12 in accordance with the invention is illustrated in FIGS. 6(a)-(h). These pictures illustrate sample user interfaces for various capabilities of a voice app for a site security and automation system operating on device 102. In accordance with the invention, the user interface highlights the unique and different manner in which a user interacts by voice command as opposed to manual entry and selection. The user interface may be arranged to keep voice command capability front and center and easy to access from within the application. The interface should be configured so as to continually teach the user how to create voice command without cluttering screens, thereby guiding the user.

Figure 6B:
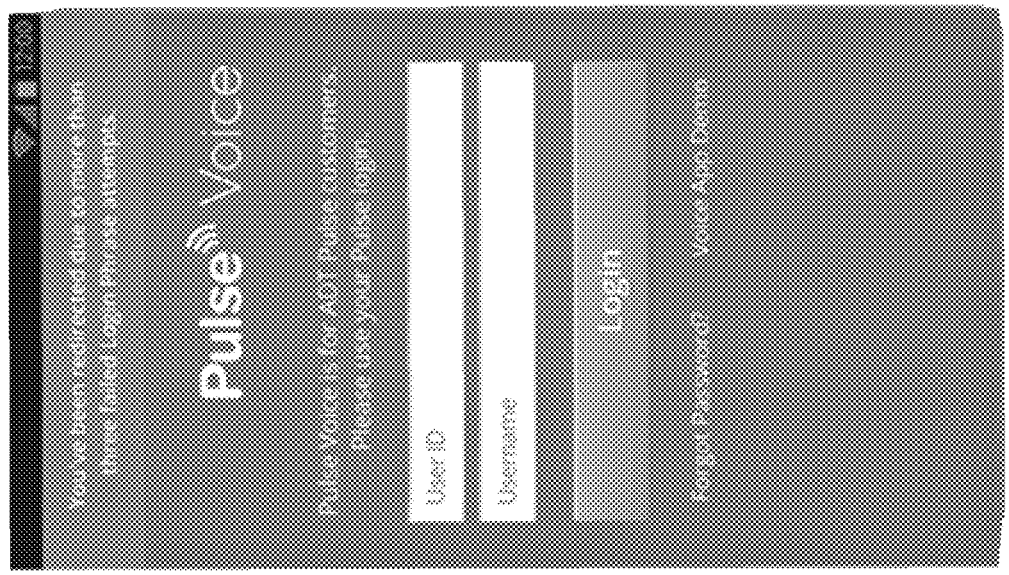
FIG. 6(b) is a screenshot of a failed voice login screen of voice application operating on a mobile device in accordance with the principles of the invention.
Figure 6A:
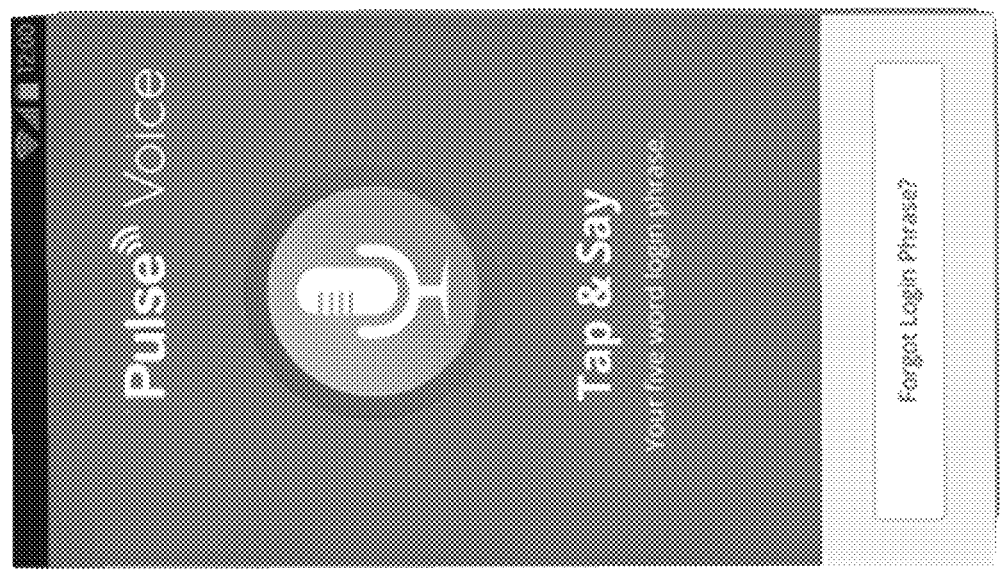
FIG. 6(a) is a screenshot of a voice login screen of voice application operating on a mobile device in accordance with the principles of the invention.

FIG. 6(a) illustrates a voice login screen of voice application 107 by which the user can initiate voice authentication and login simply by tapping a graphic element on the screen and speaking their passphrase (five words in this example, though not limited thereto). Voice application 107 may include various screens such as login screen, home screen, voice enrollment screen, security details screen, light details screen, lock details screen, thermostat details screen and energy meter details screen, among other screens. Login screen such as voice login screen supports both voice login as well as traditional keyboard password login. Home screen supports speech based command and control, with text to speech (TTS) output for status. Voice enrollment screen allows users to enroll secret verbal passphrase(s). Security details screen supports alarm panel status and GUI to arm/disarm. Light details screen supports status of light and dimmer devices, i.e., premises devices 110, and GUI to control them. Lock details screen support status of lock devices or premises devices 110 and a GUI to control them. Thermostat details screen supports status of thermostat devices or premises devices 110 and GUI to control them. Energy meter details screen support status of energy meter devices or premises devices 110.

If they have forgotten their passphrase, they can prompt voice application 107 to display (and/or, if desired, announce the passphrase, such as for those using voice application 107 with impaired vision). The sound of their voice is then converted by input 130 (e.g., the phone's microphone) to an electromagnetic audio signal indicative of the pattern of the user's voice as well as any other ambient sounds.

Figure 9:
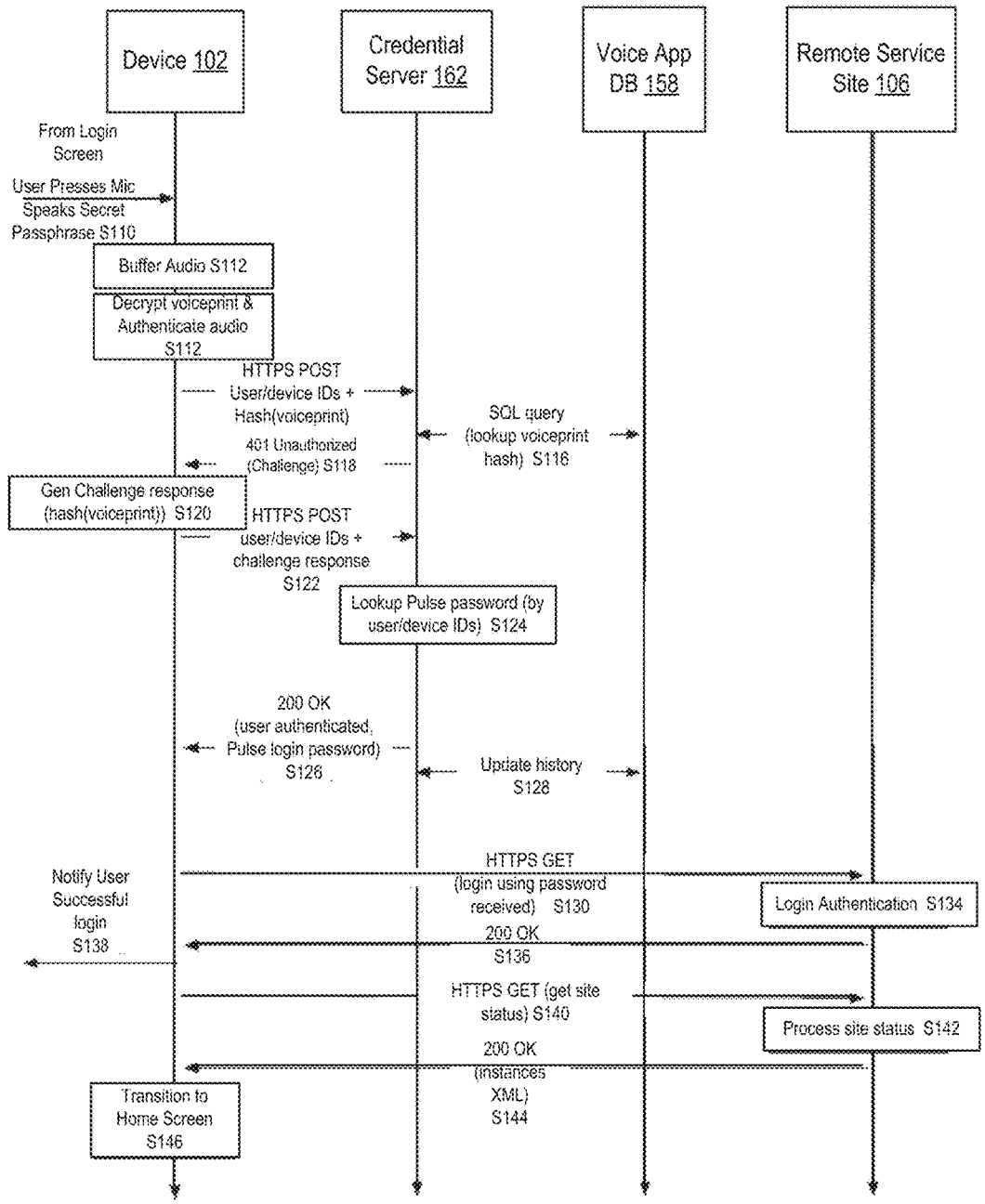
FIG. 9 is a process flow diagram for voice authentication in accordance with the principles of the present invention.

Voice application 107 then processes this signal and the voice pattern using an algorithm that uses various factors to determine the degree of match or acceptance threshold to the previously enrolled and stored voice pattern. The ability to implement an algorithm for processing the signal and the voice pattern is within the skill level of an ordinary person skilled in the art. These factors may include, for example, the amplitude and frequency components in different part of the login and stored signals, patterns in these components within the signals, statistically known patterns for voices and other ambient sounds, etc. This processing may occur locally in portable system 102 (e.g., using processor 126 and memory 128) and/or via remote service site 106. If the authentication is rejected, the user may be prompted to try again for a designated number of tries, after which the user may be presented with a failed voice login screen that allows them to login manually as illustrated in FIG. 6(b). An example of a process flow for voice login is illustrated in FIG. 9, discussed below.

Figure 6D:
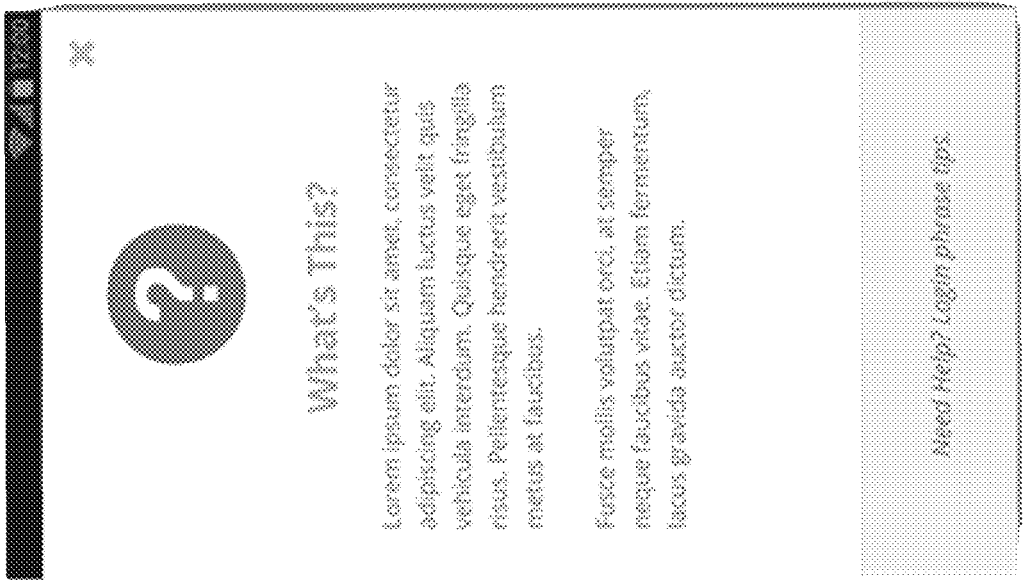
FIG. 6(d) is a screenshot of an help screen of voice application operation on a mobile device in accordance with the principles of the invention.
Figure 6C:
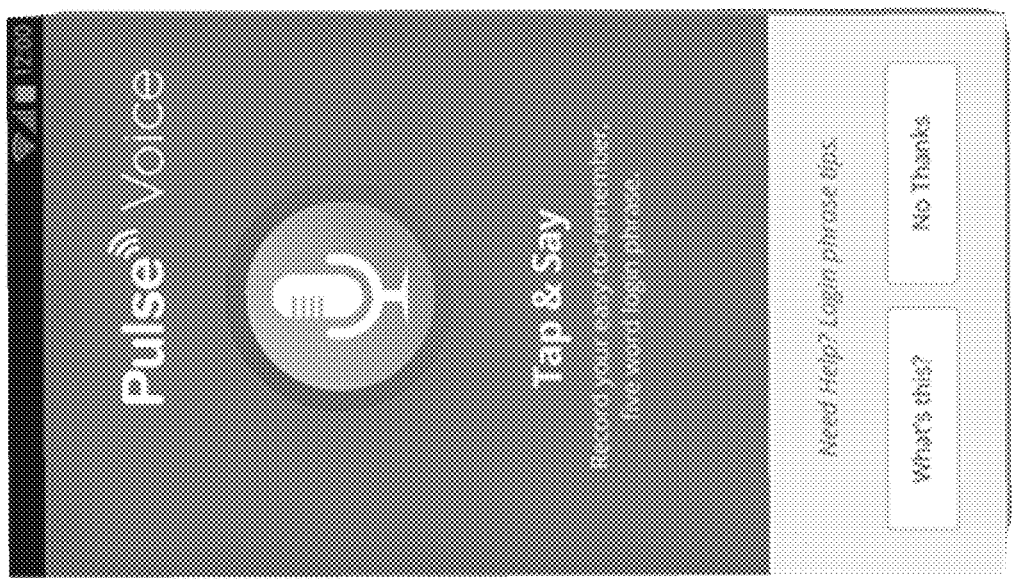
FIG. 6(c) is a screenshot of an enrollment screen of voice application operating on a mobile device in accordance with the principles of the invention.

FIG. 6(c) illustrates is a screenshot of an enrollment screen of voice application operating on a mobile device for setting up the user's voice authentication passphrase. As with voice login, the user may simply tap a graphic to initiate the enrollment process, during which voice application 107 may display instructions for the user, such as how to choose a passphrase. For example, FIG. 6(d) illustrates a screenshot of a help screen of voice application operation for providing the user with help.

Figure 6F:
FIG. 6(f) is a screenshot of a failed voice enrollment attempt of voice application operation on a mobile device in accordance with the principles of the invention.
Figure 6E:
FIG. 6(e) is a screenshot of another help screen of voice application operation on a mobile device in accordance with the principles of the invention.
Figure 10:
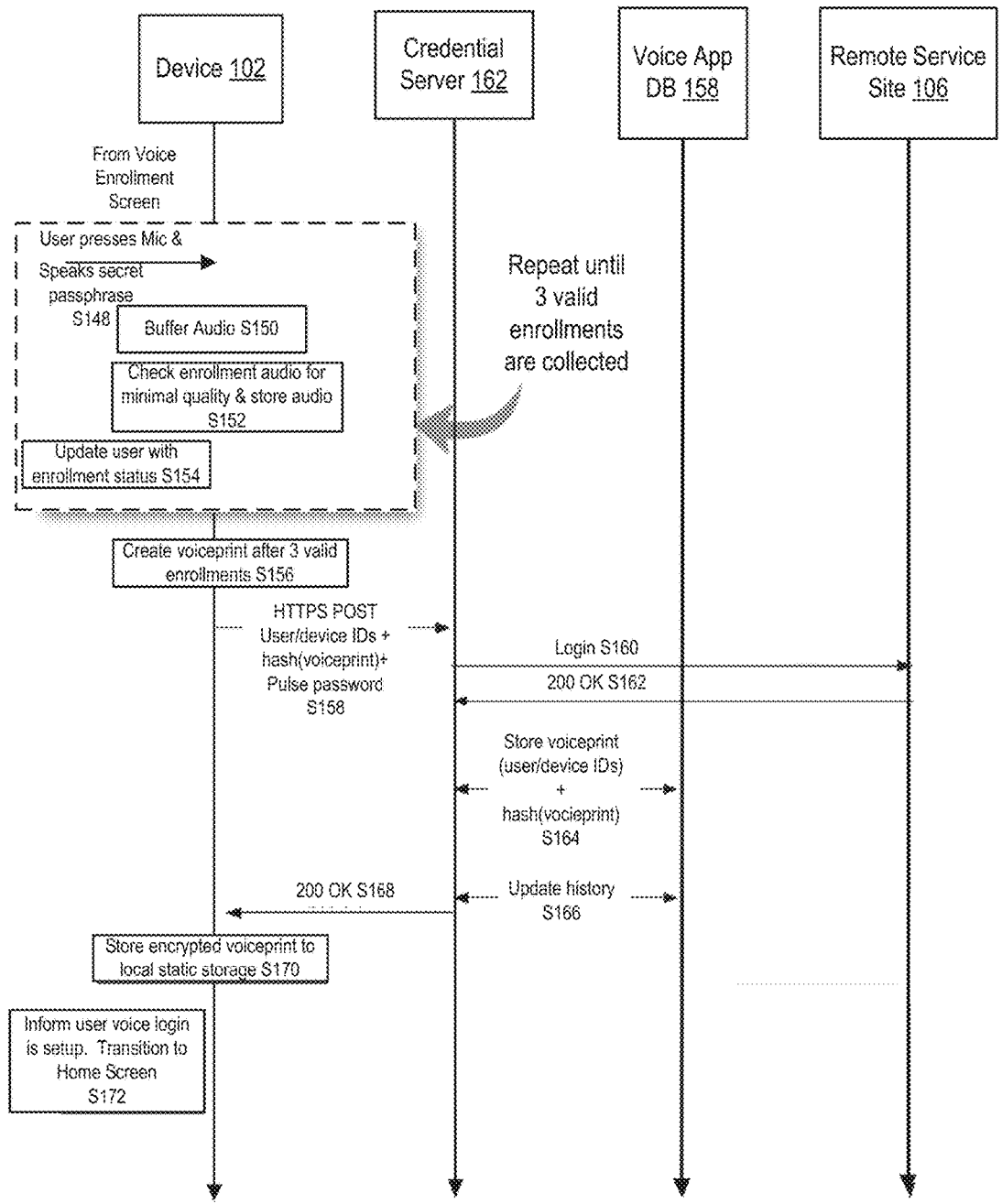
FIG. 10 is a process flow diagram of a passphrase enrollment process flow in accordance with the principles of the invention.

FIG. 6(e) is a screenshot of another help screen of voice application operation in which voice application 107 is providing the user tips and even providing some example passphrases to the user, i.e., the passphrases are generated by voice application 107 and may be displayed to the user. As above, voice application 107 may also announce the passphrase if desired. Voice application 107 could be configured to do this automatically, and/or by displaying a graphic that the user can tap to have the passphrase announced. The user will speak the passphrase and voice application 107 will similarly process the user's voice pattern against an algorithm that uses various factors to determine whether this pattern will be satisfactory for or later use in matching against a voice login. Such factors may include, for example, the "quality" of the pattern (e.g., is the pattern recognizable as a voice or does it contain too high of a level of noise or other non-voice patterns). If the pattern is satisfactory, the passphrase will be enrolled and stored for use in voice login authentication. FIG. 6(f) is a screenshot of a failed voice enrollment attempt of voice application such as if the pattern was not satisfactory. As noted above, this may be locally in voice application 107 or on a remote server. An example of a process flow for passphrase enrollment is illustrated in FIG. 10.

Figures 6G, 6H:
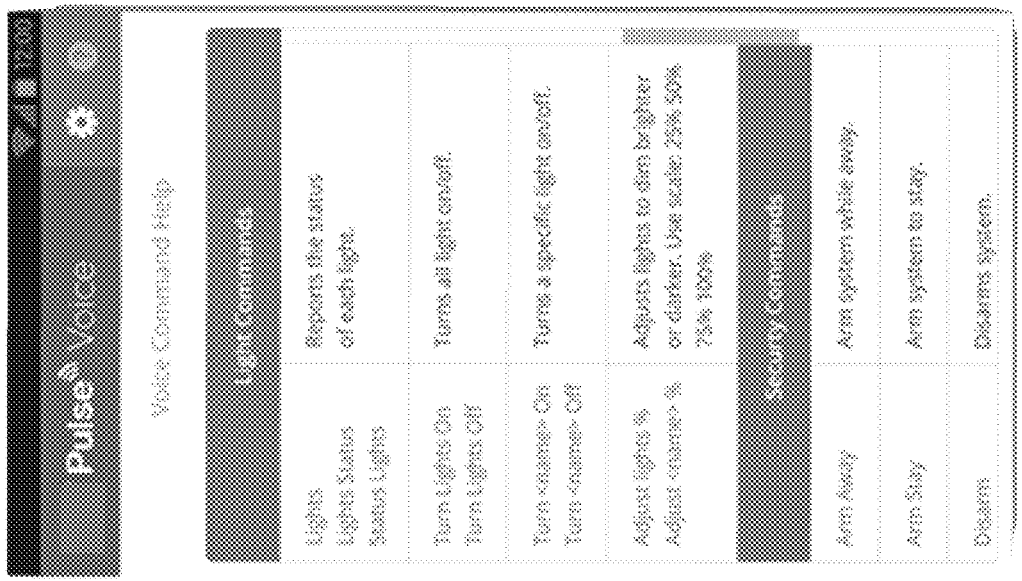
FIG. 6(g) is a screenshot of a login setup screen of voice application operation on a mobile device in accordance with the principles of the invention.
FIG. 6(h) is a screenshot of another help screen of voice application operation on a mobile device in accordance with the principles of the invention.

FIG. 6(g) is a screenshot of a login setup screen of voice application operation that allows a user to modify one or more settings of voice application 107 and one or more of the voice commands available within the application. FIG. 6(h) is a screenshot of another help screen of voice application 107 that list various voice commands a user may use. Those of ordinary skill in the art will appreciate, however, that the invention is not limited thereto.

Figure 7:
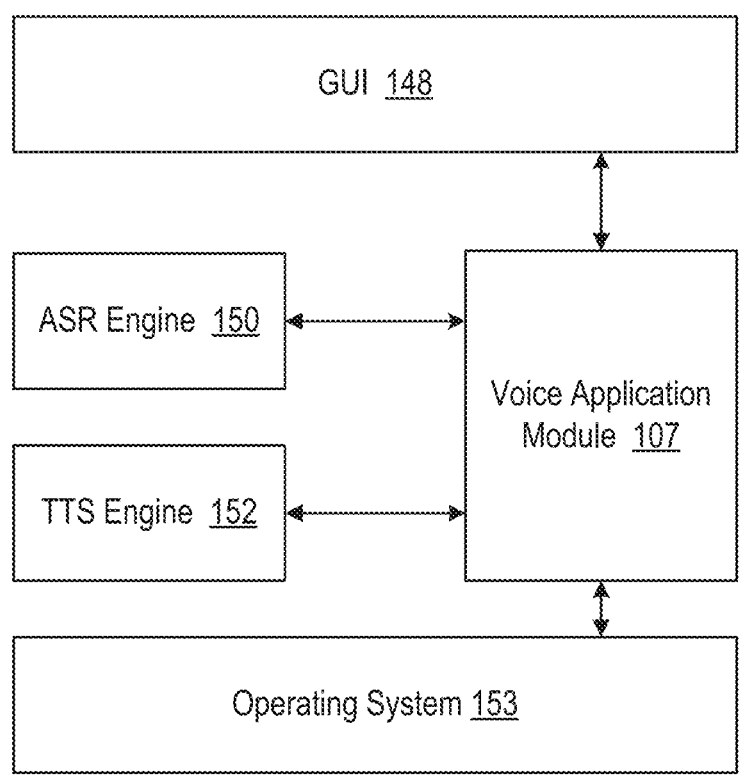
FIG. 7 is an illustration of functional elements of a mobile application operating in accordance with the principles of the invention.

FIG. 7 illustrates functional components of a portion, i.e., client side, of the system architecture. Voice app 107 may be the core client component that coordinates events among user GUI 148 activities, ASR (Automated Speech Recognition) engine 150 and TTS (Text to Speech) engine 152, Voice module/app 107 and an operating system (OS). ASR engine(s) 150 is a generic ASR manager interface that is used by the voice application/module to control ASR engines. In one embodiment, GUI 148 is an iOS or Android based GUI 148 but is not limited thereto. In one embodiment, TTS engine 152 may be a native Android TTS engine that is used for text to speech output in the voice control application. In one embodiment, OS 153 is an iOS or Android OS.

It may utilize application-specific interface protocols to interact with each server component. User can initiate control events from voice application client to the server, and/or asynchronous network events from premises devices 110 can trigger activities in the application. Voice app and/or adjustment module 109 may be Operating System (OS) independent, and OS specific wrappers may be used to customize the module for specific environments. Voice application 107 may incorporate a client-based ASR engine. Alternatively, voice application 107 may also support a hybrid ASR model where local recognition is attempted first, and network based ASR may be used as backup for speech inputs not found in the voice application's locally stored vocabulary. A client-based TTS engine is preferably used to generate audio responses.

Figure 8:
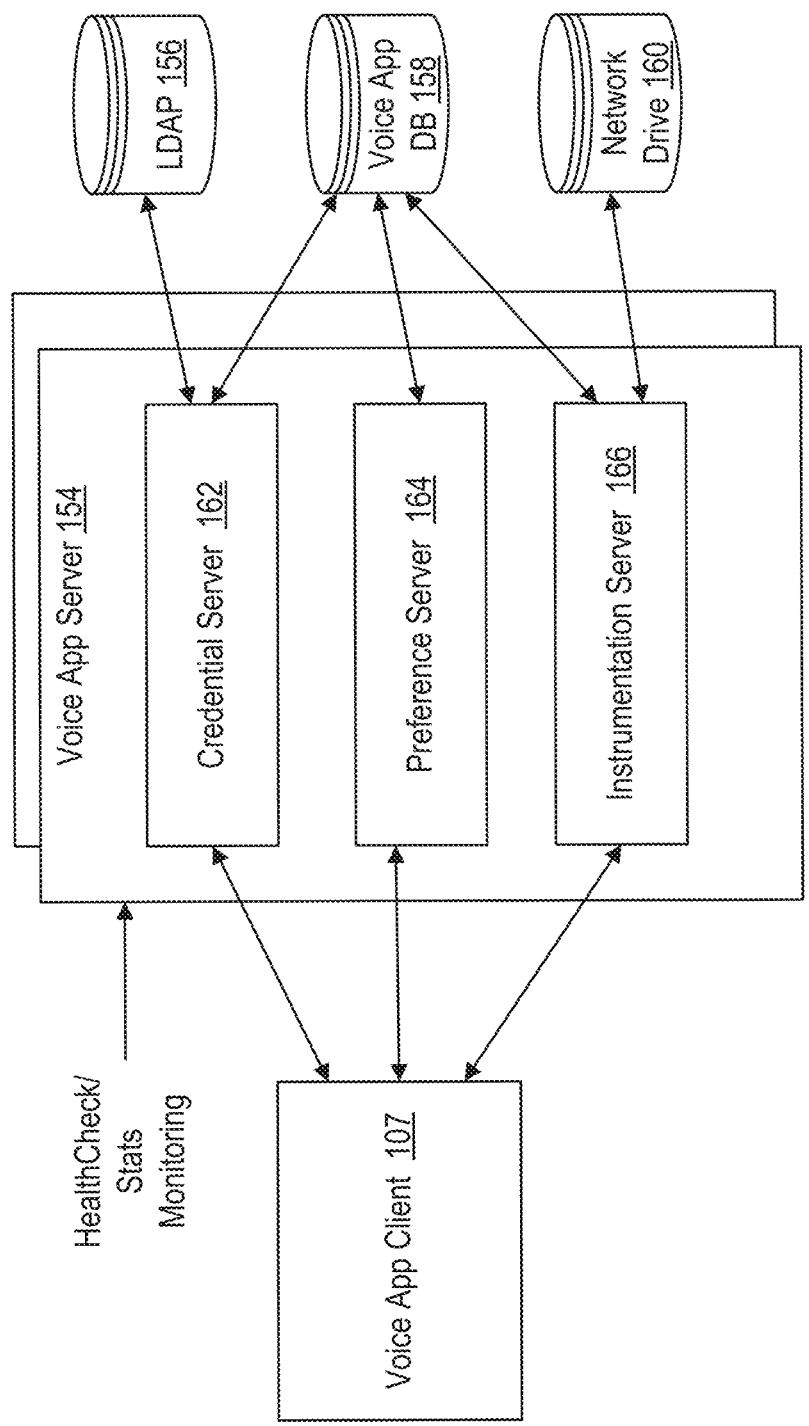
FIG. 8 is an illustration of functional elements of a device and remote service site supporting a mobile application operating in accordance with the principles of the invention.

FIG. 8 illustrates the functional components of a portion of the system architecture, i.e., server side, in accordance with the principles of the present invention. The system architecture may include voice app server cluster 154, voice app client 107 and one or more databases or storage locations such as Lightweight Directory Access Protocol (LDAP) database 156, voice app database 158 and network drive for media storage 160. Voice Application Server cluster 154 at remote service site 106 may comprise, one, two or more Voice App servers 154 configured in N+1 redundancy deployment. Each Voice App Server 154 may one or more of the following server components: Preferences Server 164, Credential Server 162, and Instrumentation Server 166 in communication with the voice app 107 client illustrated in FIG. 7.

Preference Server 164 allows administrators to configure preferences used by voice application 107 and/or adjustment module 109. At regular intervals (e.g., once per day if application 107 is in use), voice application 107 may poll the Preference Server to download updated preferences (if any). Examples of preferences to be downloaded by voice application 107 include: TTS phrases for each user feedback event, screen text for each user feedback event, frequency of preference checking, various timeouts used by the application, criteria for determining the occurrence of one of more factors, one or more thresholds for voice authentication, and latest application 107 version.

Preference Server 164 may support a number of features. For example, it may allow administrators to configure system wide preferences that affects every site accessed by voice application 107 and/or configure preferences for a group of sites. The Preference server 164 may reuse existing definitions of groups of premises devices 110 (e.g., "sites" or premises having a site security and/or automation system) and allow administrators to edit preferences based on existing group definitions. Preferences for a group of such sites may override system wide preferences. The Preference Server 164 may authenticate voice application 107 user by re-using credentials from voice application 107 to Login to server to avoid having a separate set of user credentials. It may also support external health checks and statistics monitoring via HTTP/HTTPS, load-balanced, N+1 server architecture for redundancy and auto-failover, and redirection to server clusters in different region(s).

Credential Server 162 may supply credentials stored on remote service site 106 to voice application 107 after a user is authenticated via voice login. When voice login is used to authenticate a user, voice application 107 may require additional credentials (e.g., a user's password or login token for their site security system) before the app can login to the security system (or a server at remote service site 106 for relaying to the security system). Voice application 107 may use a hashed version of a user's voiceprint as its secret to authenticate against the Credential Server 162, and, once authenticated (via digest challenge-response, for example), the Credential Server 162 may look up the user's login credential (password or login token) and return it to the application.

Credential Server 162 may support allowing voice application 107 to retrieve a user's credentials by using a user's voiceprint, authenticating retrieval by using digest authentication with user's hash voiceprint as secret, as well as external health-checks and statistics monitoring via HTTP/HTTPS, load-balanced, N+1 server architecture for redundancy and auto-failover, and redirection to server clusters in different region(s).

Instrumentation Server 166 may be used to enable the system to collect anonymous user audio inputs that can be used to fine-tune ASR and Voice Login performance. Users may "opt-in" to send anonymous audio data to the system 100 and have audio inputs captured and sent to Instrumentation Server 166. Audio media files may be stored on a shared network drive accessible by all Instrumentation Server instances. Instrumentation Server 166 may support enabling background processes using uploaded audio media files for improving ASR and/or Voice, login performance, allowing administrators to configure server settings (such as: maximum audio files retained, frequency of background processes, external media storage settings), as well as external health-checks and statistics monitoring via HTTP/HTTPS, load-balanced, N+1 server architecture for redundancy and auto-failover, and redirection to server clusters in different region(s).

FIG. 9 illustrates a process flow for voice login of voice app 107 in accordance with the principles of the invention. Device 102 receives, via a login screen, a voice passphrase or word (Block S110). For example, user of device 102 may press a microphone button on device 102 that allows device 102 to receive a voice passphrase from a user. In one embodiment, device 102 buffers audio, i.e., the voice passphrase, decrypts the voiceprint and authenticates the audio (Block S112). Device 102 transmits a HTTPS POST message to credential server 162 (Block S114). In one embodiment, the HTTPS POST message includes user/device IDs and a hash of voiceprint. Credential server 162 retrieves system password such as by using user/devices IDs and hash of voiceprint (Block S124). Credential server 162 transmits a 200 OK message is the user is authenticated (Block S126). In one embodiment, the 200 OK message includes a login password. Credential server 162 and voice application database 158 may update their respective histories or records (Block S128).

Device 102 transmits a HTTPS GET message to remote service site 106 (Block S130). Remote service site 106 authenticates the login (Block S134). After authenticating the login, remote service site 106 transmits a 200 OK message to device 102 (Block S136). In response to receiving the 200 OK message from remote service site 106, device 102 notifies the user of device 102 of the successfully login via device 102 display (Block S138). Device 102 transmits a HTTPS GET message to remote service site 106 to get the site status (Block S140). Remote service site 106 determines the site status and transmits a 200 OK message to device 102 including XML instances (Block S144). After receiving the 200 OK message with XML instances, device 102 transitions to a home screen (Block S146).

FIG. 10 illustrates a process flow of voice app for enrollment a user's voice in system 100 in accordance with the principles of the present invention. Device 102 may receive, via a login screen, a voice passphrase or word (Block S148). For example, user of device 102 may press a microphone button on device 102 that allows device 102 to receive a voice passphrase. Device 102 buffers the audio (Block S150). Device 102 checks the enrollment audio for minimal quality and stores the audio is the minimum audio quality is met (Block S152). Device 102 updates the enrollment status displayed to the user (Block S154). In one embodiment, Blocks S148-S154 may be repeated until at least three audio enrollments that meet the minimum audio quality are collected.

Device 102 creates a voiceprint (Block S156). In one embodiment, the voiceprint may be based on the three collected voiceprints. Device 102 transmits an HTTPS POST message to credential server 162 (Block S158). In one embodiment, the HTTPS POST message includes user/device IDs, a hash of the voiceprint and a password. Credential server 162 then transmits the login information to remote service site 106 (Block S160). Remote service site 106 then transmits a 200 OK message to credential server 162 (Block S162). Credential server 162 and voice application database 158 then update their respective databases to store the voiceprint, user/device IDs, hash of the voice print (Block S164). Other information may also be stored based on design need. Credential server 162 and voice application database 158 then update their respective histories or records (Block S166). Credential server 162 then transmits a 200 OK message to device 102 (Block S168). Device 102 then stores the encrypted voice print in memory 128 (Block S170). Device 102 informs the user of device 102 that the voice login setup is complete via a display of device 102 and then transitions to the home screen (Block S172).

As will be appreciated by one of skill in the art, the concepts described herein may be embodied as a method, system, device, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A system for performing authentication to enable a user to access a site monitoring system via a user interface, the authentication including voice authentication having at least one threshold that is dynamically adjustable between false-rejection and false-acceptance, the system comprising a user device, the user device having:
   a memory configured to store the at least one threshold;
   a processor in communication with the memory, the processor configured to:
      adjust the at least one threshold for the voice authentication, the adjustment to the at least one threshold being based on at least one factor associated with the site monitoring system, the at least one threshold being adjusted to increase a probability of false-rejection when the device is not proximate a site monitored by the site monitoring system, and the at least one threshold being adjusted to increase a probability of false-acceptances when the device is proximate the site monitored by the site monitoring system; and
      perform voice authentication based on the adjusted at least one threshold to authenticate the user.

2. The system of claim 1, wherein the user device is a portable wireless device.

3. The system of claim 1, further comprising a server in communication with the user device, the server including:
   a communication interface configured to communicate a plurality of predetermined thresholds for voice authentication to the device, the plurality of predetermined thresholds corresponding to a plurality of factors including the at least one factor; and
   the processor configured to:
      determine that one of the plurality of factors are met; and
      determine at least one of the plurality of thresholds corresponding to the factor that is met, the adjustment of the at least one threshold for the voice authentication being based on the determined at least one of the plurality of thresholds.

4. The system of claim 1, wherein the at least one factor includes at least one of geo-location data for the user device, Internet Protocol address of the user device, login enforcement by the user device, background acoustic environment of the user device and a predefined time period since a last non-voice based login with the site monitoring system.

5. The system of claim 4, wherein the at least one threshold is adjusted based on at least on the geo-location data for the user device associated with the site monitoring system.

6. The system of claim 1, wherein the at least one threshold includes a degree of match between a voice signal and a voice pattern.

7. The system of claim 1, wherein the voice authentication requires matching at least one audio challenge phrase.

8. The system of claim 1, wherein the authentication is a multi-factored authentication in combination with the voice authentication.

9. The system of claim 8, wherein the multi-factor authentication includes at least one of knowledge based authentication, security token based authentication, user device based authentication, biometric based authentication and manual login.

10. The system of claim 8, wherein the multi-factor authentication provides access to predetermined functionality including at least one of Arm/Disarm, Lock/Unlock and accessing video.

11. A method for performing authentication to enable a user to access a site monitoring system via a user interface, the authentication including voice authentication having at least one threshold that is dynamically adjustable between false-rejection and false-acceptance, the method comprising:
adjusting the at least one threshold for the voice authentication, the adjustment of the at least one threshold being based on at least one factor associated with the site monitoring system, the at least one threshold being adjusted to increase a probability of false-rejection when a user device associated with the site monitoring system is not proximate a site monitored by the site monitoring system, and the at least one threshold being adjusted to increase a probability of false-acceptances when the user device is proximate the site monitored by the site monitoring system; and
performing voice authentication based on the adjusted at least one threshold to authenticate the user.

12. The method of claim 11, wherein the at least one factor includes at least one of geo-location data of the device, Internet Protocol address of the device, login enforcement by the device, background acoustic environment of the device and a predefined time period since a last non-voice based login with the site monitoring system.

13. The method of claim 12, wherein the at least one threshold is adjusted based on at least on the geo-location data for a user device associated with the site monitoring system.

14. The method of claim 11, wherein the at least one threshold includes a degree of match between a voice signal and a voice pattern.

15. The method of claim 11, wherein the voice authentication requires matching at least one audio challenge phrase.

16. The method of claim 11, wherein the user authentication is a multi-factored authentication in combination with the voice authentication.

17. The method of claim 16, wherein the multi-factor authentication is includes at least one of knowledge based authentication, security token based authentication, user device based authentication, biometric based authentication and manual login.

18. The method of claim 16, wherein the multi-factor authentication provides access to predetermined functionality including at least one of Arm/Disarm, Lock/Unlock and accessing video.

\* \* \* \* \*